June 19, 1956
J. R. SIBLEY
2,751,204
DISINTEGRATING HEAD MECHANISM WITH CHAIN TAKE-UP FOR A CONTINUOUS MINER
Filed Jan. 23, 1952
2 Sheets-Sheet 1
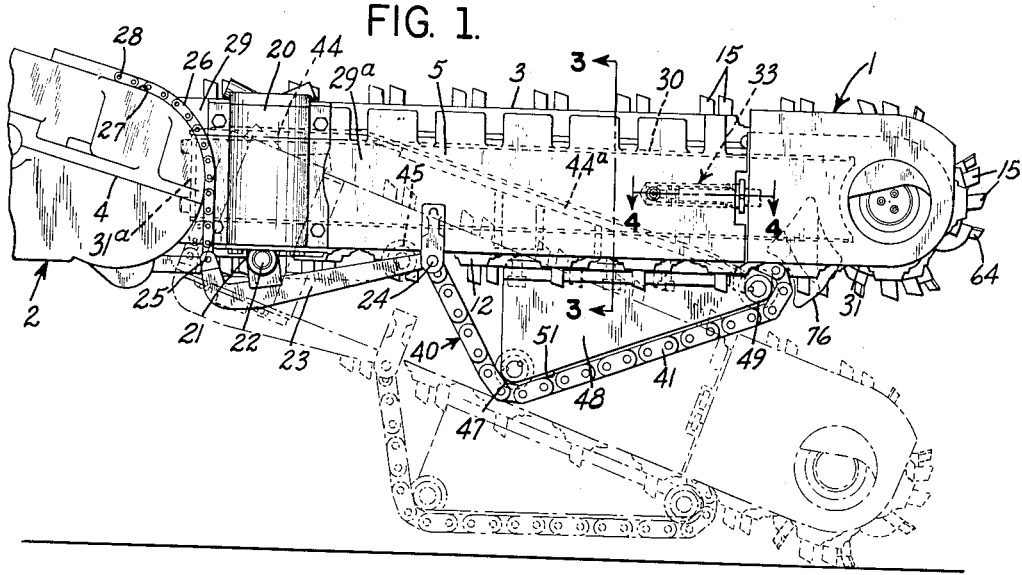
FIG. 1.
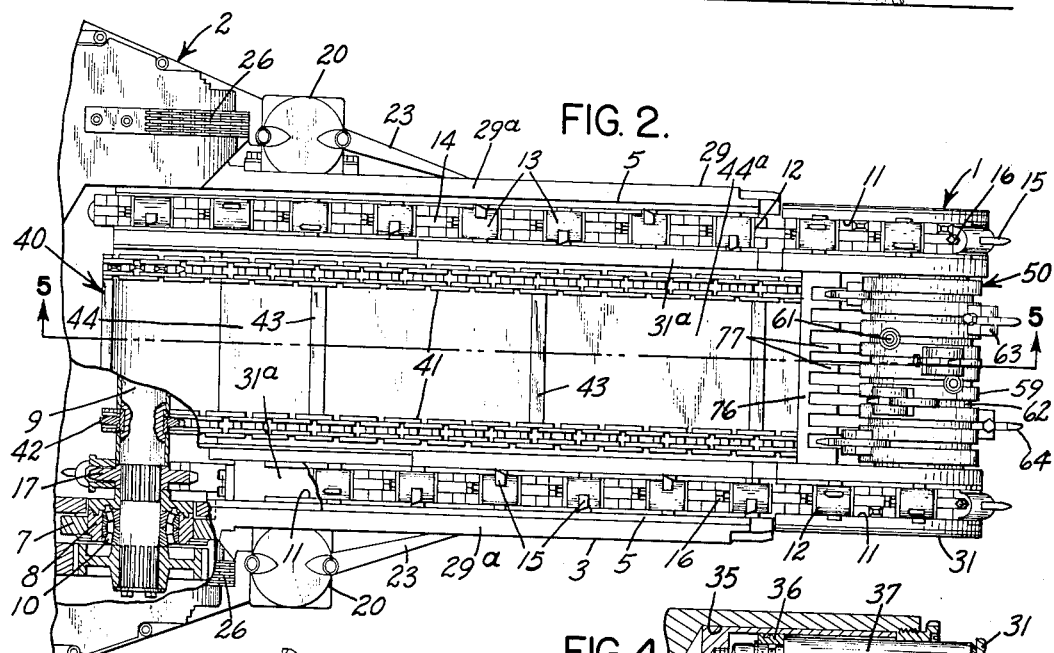
FIG. 2.
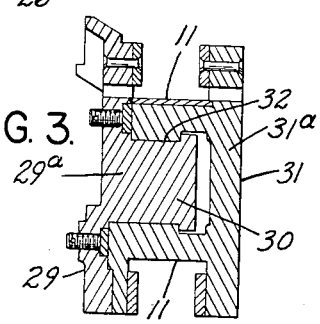
FIG. 3.
FIG. 4.
INVENTOR:
JOHN R. SIBLEY.
BY Charles F. Osgood,
ATTORNEY June 19, 1956
J. R. SIBLEY
2,751,204
DISINTEGRATING HEAD MECHANISM WITH CHAIN TAKE-UP FOR A CONTINUOUS MINER
Filed Jan. 23, 1952
2 Sheets-Sheet 2
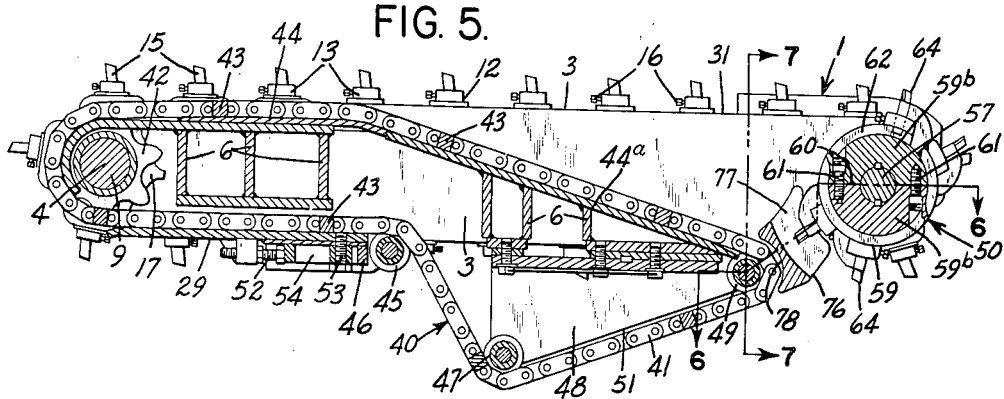
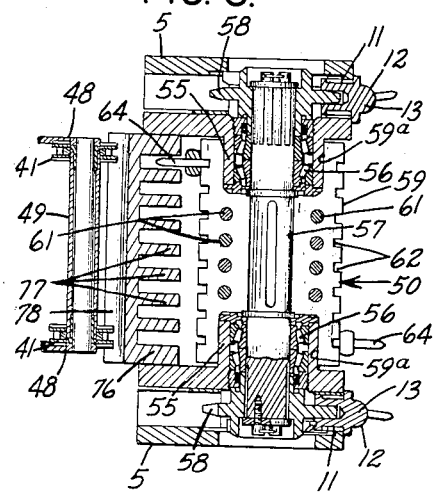
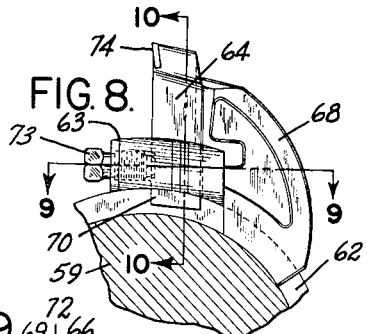
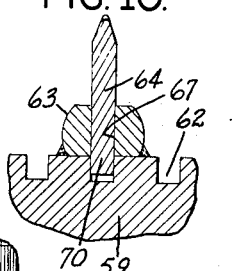
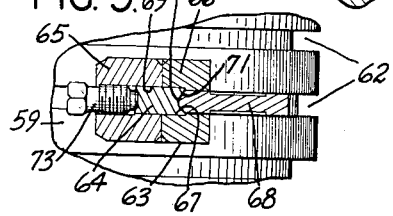
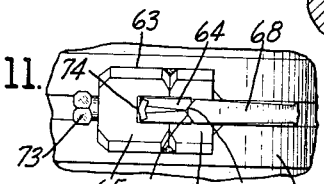
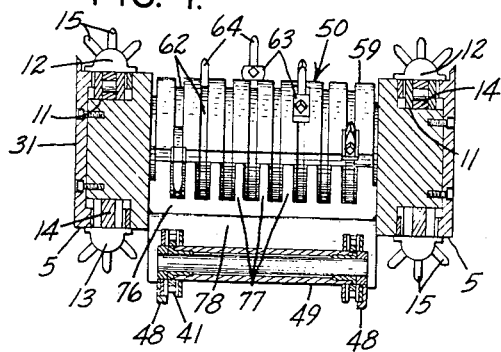
INVENTOR:
JOHN R. SIBLEY
BY
Charles F. Osgood,
ATTORNEY

United States Patent Office 2,751,204
Patented June 19, 1956

2,751,204

DISINTEGRATING HEAD MECHANISM WITH CHAIN TAKE-UP FOR A CONTINUOUS MINER

John R. Sibley, Franklin, Pa., assignor to Joy Manufacturing Company, Pittsburgh, Pa., a corporation of Pennsylvania Application January 23, 1952, Serial No. 267,717

16 Claims. (Cl. 262—9)

This invention relates to a disintegrating head mechanism and more particularly to a drum type disintegrating head for dislodging mineral such as coal from a solid mine vein.

In a known type of continuous miner, a disintegrating head mechanism is pivotally mounted to swing in vertical planes during the dislodging operation and embodies a series of parallel endless disintegrating chains guided for circulation in parallel vertical orbits. Such chain type disintegrating heads, while relatively effective in dislodging the solid coal, under certain conditions, reduce the size of lump coal obtainable and, due to their relatively complicated chain and chain guide structure, necessitate relatively high repair and replacement costs. Also, in such known type of miner a separate floor clean-up mechanism is usually required in order to gather up and load any loose mineral which falls to the mine floor during the dislodging operation. The present invention contemplates improvements over such known type of disintegrating head mechanism in that the disadvantages above outlined are substantially overcome, resulting in a substantial increase in the lump size of coal obtainable and greatly decreasing the repair and replacement costs as well as reducing the power consumed.

An object of the present invention is to provide an improved disintegrating head mechanism for a continuous miner whereby the production of mineral such as coal from a solid mine vein is substantially and more economically increased. Another object is to provide an improved disintegrating head of the rotary drum type wherein a rotary toothed drum is driven by endless side disintegrating chains in an improved manner. A further object is to provide an improved disintegrating head mechanism which is mounted to swing in vertical planes and including parallel side disintegrating chains which drive a forwardly located toothed drum or rotary bar arranged transversely at the outer portion of the head mechanism, and having conveying means mounted on the head longitudinally intermediate the side chains in a position to receive the disintegrated mineral discharged from the rotary drum or bar. Another object is to provide an improved disintegrating head embodying parallel vertical side bars rigidly connected in spaced parallel relation and having journaled at the forward portion thereof a rotary toothed drum driven by the side chains, and having a toothed deflector or grizzly rigidly secured to the side bars and extending therebetween rearwardly of the rotary drum. Yet another object is to provide an improved disintegrating head mechanism embodying a rotary toothed drum and a conveyor and having a novel deflector bar for directing the disintegrated mineral from the drum toward the conveyor and for stripping loose mineral from the bottom run of the conveyor when the latter is positioned to move loose mineral on the mine floor forwardly toward the drum beneath the latter. Another object is to provide an improved rotary toothed drum structure for a disintegrating head mechanism. Still another object is to provide an improved hydraulic take-up mechanism for placing the endless side chains under proper tension. These and other objects and advantages of the invention will, however, hereinafter more fully appear as the description proceeds.

In the accompanying drawings there is shown for purposes of illustration one form which the invention may assume in practice.

In these drawings:

Fig. 1 is a side elevational view of a disintegrating head mechanism constructed in accordance with a preferred illustrative embodiment of the invention, with the lowered position of the head mechanism shown in dotted lines.

Fig. 2 is a plan view of the head mechanism shown in Fig. 1.

Fig. 3 is an enlarged detail vertical section taken on line 3—3 of Fig. 1, with the side chain omitted.

Fig. 4 is an enlarged detail section taken on line 4—4 of Fig. 1, showing the hydraulic chain take-up.

Fig. 5 is a central longitudinal vertical section taken on line 5—5 of Fig. 2.

Fig. 6 is an enlarged developed section taken substantially in the planes of line 6—6 of Fig. 5, illustrating details of the rotary drum structure.

Fig. 7 is an enlarged cross sectional view taken on line 7—7 of Fig. 5.

Fig. 8 is an enlarged detail section taken through the drum and showing one of the mountings for a disintegrating tooth.

Fig. 9 is a detail horizontal section taken on line 9—9 of Fig. 8.

Fig. 10 is a detail vertical section taken on line 10—10 of Fig. 8.

Fig. 11 is a fragmentary plan view of the tooth structure shown in Figs. 6, 7 and 8.

The improved disintegrating head mechanism is generally designated 1 and is mounted on a supporting means generally designated 2, the latter being desirably in the form of a frame mounted on a mobile machine base in a manner similar to that disclosed in my copending application, Serial No. 102,996 filed July 5, 1949. Evidently, the improved head mechanism may be mounted in various other manners.

The improved disintegrating head mechanism comprises a frame or bar structure 3 pivotally mounted at 4 on the supporting means 2 to swing in vertical planes, and the bar structure comprises parallel vertical side bar portions 5 rigidly connected in parallel spaced relation by transverse frame portions 6 rigidly secured, as by welding, to the inner sides of the vertical side bar portions. The side bar portions have rear bearing engaging portions 7 (Fig. 2) which are pivotally supported by lateral bearing members or hollow trunnions 8 provided by the supporting means 2, and a rotatable cross shaft 9, coaxial with the head frame pivot, is journaled in bearings 10 supported within the bearing members 8, as shown in Fig. 2. This cross shaft may be driven in a manner similar to that fully disclosed in the copending application above referred to. The parallel side bar portions 5 have suitable guideways 11 extending about their margins and guided for orbital circulation in these guideways are endless disintegrating chains 12 comprising chain blocks 13 pivotally connected together by strap links 14. The chain blocks have sockets for receiving the shanks of detachable disintegrating elements or bits 15 which are held in the block sockets by conventional set screws 16. Keyed to the cross shaft 9 are chain sprockets 17 which engage and drive the endless side disintegrating chains 12.

The means for swinging the head mechanism in vertical planes about its pivot may assume various conventional forms and herein, for illustrative purposes, may be similar to that disclosed in the copending application to John D. Russell, Serial No. 215,431, filed March 14, 1951, and comprises upright fluid cylinders 20 rigidly secured to the outer sides of the side bars 5 of the head frame and containing pistons (not shown) connected by downwardly extending piston rods or connecting links 21, at 22, to lever arms 23, the latter in turn being pivotally connected at their forward ends at 24 to the sides of the head frame. The lever arms are also connected at their rear ends at 25 to flexible chain sections 26 which lie about curved surfaces 27 on the supporting means 2, these chain sections being suitably fastened at 28 to the upper portion of the supporting means. When liquid under pressure is supplied to the upper ends of the cylinders 20, the latter move upwardly relative to the piston, causing swinging of the lever arms, and resulting in upward swing of the disintegrating head mechanism. When liquid is trapped in the cylinders, the head mechanism may be held in adjusted position, and when liquid is vented from the cylinders the head mechanism may swing downwardly about its pivot. Since this swing mechanism is well known, further detail description thereof is herein unnecessary.

The outer head portion of the swingable bar frame is adjustable longitudinal relative to the rear frame portion thereby to enable tensioning of the side disintegrating chains, and the rearward head portion 29 has rigid longitudinal guides 30 at the inner sides of the side bar portions 5, and the outer head portion 31 has rearward guide portions providing elongated guideways 32 slidingly receiving the guides 30. The rear head frame portion 29 has a rear pivoted end and comprises parallel longitudinally and forwardly extending side portions 29ᵃ which at their inner sides provide the guides 30 and the adjustable head frame portion 31 has rearwardly extending parallel side portions 31ᵃ providing the longitudinal guideways 32 which slidingly receive the guides 30. The rearward parallel portions of the adjustable frame portion 31 extend rearwardly into adjacency with the pivoted rear end of the rear frame portion 29, as shown in Figs. 1 and 2. Thus, an extremely rigid guiding means providing relatively large bearing areas is provided for the adjustable portion of the head frame. The guide and guideway providing portions of the head frame portions 29 and 31 comprise elements of the vertical side bar portions 5 which provide the guideways for the endless side chains 12, and portions of the vertical side bar portions 5 are provided by the rear head frame portion 29 and the adjustable head frame portion 31. Hydraulic take-up devices generally designated 33 are arranged longitudinally of the forward portions of the guides 30 at the opposite sides of the head frame and are connected between the rear frame portion and the adjustable outer head portion for adjusting the latter, and each device comprises a hydraulic cylinder 34 (Fig. 4) secured in a bore 35 formed in the sides of the rearward head portion and containing a piston 36 having a piston rod 37 which at its forward end abuts at 38, a rearwardly facing surface on the adjustable head frame portion 31. A conventional grease gun fitting 39 is connected with each cylinder so that a liquid grease may be pumped into the cylinder thereby to move the pistons in the chain tensioning direction. Each fitting embodies the usual check valve (not shown) so that flow of liquid from the cylinders is automatically prevented. By detaching these fittings or by suitably opening the check valves, liquid may be discharged from the cylinders.

An endless flight conveyor, generally designated 40, is guided for orbital circulation along suitable guideways provided by the head frame and is arranged longitudinally intermediate the parallel side bar portions and this conveyor comprises parallel endless side chains 41 which pass around and are driven by chain sprockets 42 (Fig. 2) secured to the cross shaft 9. Connected between the side conveyor chains are cross flights 43 which are adapted to move the disintegrated mineral along a bottom plate 44 extending between and secured to the vertical side bars. This bottom plate has a forwardly and downwardly inclined forward portion 44ᵃ extending to the bottom of the front portion of the head frame, as shown in Fig. 5. The bottom runs of the conveyor side chains extend forwardly from the drive sprockets and pass around an adjustable transverse guide roll 45 mounted on a slide 46 in turn slidably mounted in a suitable guideway on the lower portion of the rearward head frame portion. The bottom runs of the conveyor side chains extend forwardly and sharply downwardly from the roll 45 to a transverse guide roll 47 journaled on depending brackets 48 secured to the sides of the adjustable head frame portion, and the conveyor side chains extend upwardly and forwardly to a transverse guide roll 49 journaled on the brackets 48 and located close to the bottom of the head frame just rearwardly of a rotary toothed drum or bar, generally designated 50, near the bottom of the latter. This rotary drum is arranged transversely of the outer end portion of the head frame as later described. These side brackets 48 provide rearwardly and downwardly inclined guides 51 for the side chains of the bottom run of the conveyor intermediate the guide rolls 47 and 49, as shown in Figs. 1 and 5. The slide 46 is adjustable by screws 52 and screws 53 pass through longitudinal slots 54 at the opposite sides of the slide 46 and these latter screws when tightened firmly clamp the slide in adjusted position on the head frame. When the disintegrating head mechanism is lowered, as shown in dotted lines in Fig. 1, the bottom run portion of the conveyor which extends between the guide rolls 47 and 49 is disposed in substantial parallelism with the mine floor and engages any loose mineral piled up on the floor and moves the same forwardly toward the rotary drum, and the latter in turn engages such mineral and moves the same upwardly and rearwardly onto the top run of the conveyor. Thus, the conveyor of the head mechanism not only moves the disintegrated mineral discharged from the rotary drum 50 and the side chains 12 rearwardly of the head mechanism but also serves to move the loose mineral on the mine floor into such position as to be engaged by the rotary drum 50, thus, affording a supplement floor clean-up device. This supplemental floor clean-up device is not my invention, but is the invention of Arthur Lee Barrett, and is being claimed in a copending application Serial No. 293,999, owned by the assignee of the present invention. The forward portion of the conveyor is mounted on and is movable with the adjustable portion 31 of the head frame relative to the rearward frame portion 29 on which the rearward portion of the conveyor is guided and the forward conveyor portion moves bodily with the rotary drum upon tensioning of the side chains 12 by the hydraulic cylinder and piston devices 33. Thus, when the side chains 12 are adjusted by the devices 33, the conveyor chain must at the same time be readjusted by the adjustable guide roll 45.

Now referring to the specific structure of the rotary drum or bar 50, it will be noted that projecting inwardly toward one another at the inner sides of the vertical side portions of the adjustable head frame portion are cylindrical bearing supports 55 which support bearings 56 in which a front cross shaft 57 is journaled. This cross shaft is arranged in parallelism with the rear cross shaft 9 and chain sprockets 58 housed within the side portions of the head frame are keyed to the ends of this shaft and are engaged and driven by the side chains 12. The rotary drum has a cylindrical body 59 mounted on and surrounding the cross shaft 57 between the vertical side bar portions of the head frame. The ends of the drum body are circularly recessed at 59ᵃ closely to receive the cylindrical bearing supports 55 (Fig. 6). The drum body is desirably split longitudinally and its coacting semicircular parts 59ᵇ abut along a diametric plane at 60 and are rigidly bolted together and held in assembled relation on the shaft by screws 61 engaging the drum parts. The body of the drum is peripherally grooved at 62 along its length and these grooves are annular and extend circumferentially of the drum, and these annular grooves receive mountings 63 for disintegrating teeth or bits 64 on the drum. These grooves provide rigid lateral supports for the bits as later described and provide proper spacing of the bits axially of the drum. The disintegrating teeth are arranged in staggered relation on the drum and are staggered with respect to the disintegrating bits of the side chains so that a multiplicity of bits will not concurrently engage the mineral to be dislodged but rather move successively into dislodging contact with the mineral.

Each of the bit mountings 63 comprises a pair of co-operating lugs 65 and 66 having curved inner surfaces which lie against the curved outer drum periphery and rigidly secured, as by welding, to the drum (Figs. 9 and 10). The rear lug 66 is suitably slotted at 67 to receive the forward portion of a backing plate 68 having a curving rearward surface and secured, as by welding, in one of the drum grooves. The front lug 65 is suitably slotted at 69 and the slots 67 and 69 in the two lugs cooperate to provide a radial socket for receiving the shank 70 of the bit 63. The back of the bit is formed with a shallow longitudinal groove of V-shaped cross section at 71 and the backing plate has a forward V-shaped edge portion 72 against which the back of the bit rests, and a set screw 73 threaded in the front lug 65 engages the bit shank to hold the bit rearwardly rigidly in position. The cooperating V-shaped surfaces on the bit and backing plate tend to center the bit, and the grooving of the bit instead of the support avoids the possibility of splitting of the support which might occur if the support were grooved. The bits have forward tips 74 of hard wear-resisting material at their outer extremities and the lower ends of the bit shanks project inwardly into the drum grooves as shown in Fig. 8. Thus, the disintegrating bits may be firmly secured in disintegrating position on the drum in the staggered relation as shown.

Extending transversely between the vertical side bar portions of the adjustable head frame portion and rigidly secured, as by welding, thereto is a deflector or grizzly bar 76. This cross bar is arranged near the bottom of the forward portion of the head frame just rearwardly of the lower rearward portion of the rotary drum 50 and has a series of forwardly projecting parallel vertical teeth 77 of comblike formation. This transverse row of teeth projects forwardly between the bits of the rotary drum and serves to deflect the larger pieces of disintegrated mineral from the drum and to direct the same toward the conveyor. This cross deflector bar also has a rearwardly facing curved surface 78 (Fig. 5) which lies close to the forward portion of the conveyor as the latter passes around the front guide roll 49 and serves to strip any loose mineral from the bottom run of the conveyor during the floor clean-up operation.

The disintegrating head mechanism of the present invention is sumped into the mineral of the solid mine vein at the floor level and upon completion of the sumping operation is swung upwardly in vertical planes until its outer end reaches the roof level and finally the head mechanism is retracted from the working face to complete the cut, all in the manner fully disclosed in my co-pending application, Serial No. 102,996 referred to above. Since the present invention resides in the particular structure of the head mechanism further description of the mode of operation of the machine with which the head mechanism is associated is herein unnecessary, other than to state that the disintegrating bits of the side chains and the rotary drum tear out the mineral from the solid mine vein and move the disintegrated mineral onto the conveyor of the head mechanism which in turn moves the disintegrated mineral rearwardly of the head mechanism to a convenient point of discharge rearwardly of the head pivot.

As a result of this invention an improved disintegrating head mechanism for a continuous miner is provided whereby the mineral of a solid mine vein may be dislodged rapidly and efficiently while at the same time the lump size of the mineral is substantially increased. By the provision of the particular side chain, rotary drum and conveyor arrangement, the head structure is substantially simplified and the cost of maintenance is substantially decreased. The improved rotary drum structure due to its simplified construction, may be readily manufactured at relatively low cost and may be quickly assembled and disassembled. The improved bit mountings on the drum insure relatively great rigidity and ruggedness. By the provision of the movable deflector bar or grizzly common to both the rotary drum and the conveyor, the mineral is deflected from the drum teeth and is stripped from the bottom run of the conveyor, in an extremely effective manner. The elongated guide structure provided for the adjustable portion of the head frame provides for rigidity in construction, thereby greatly reducing the possibility of breakage. The hydraulic adjusting means for the adjustable portion of the head frame provides an improved take-up for the side disintegrating chains. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a disintegrating head mechanism, a rotary toothed mineral disintegrating drum, a drive shaft extending axially through said drum and on which said drum is mounted, said drum comprising two mating component parts having semicircular peripheral grooves and screws for rigidly securing said drum parts together in assembled relation on said drive shaft, said grooves when said drum parts are assembled being in registry and cooperating to provide annular grooves extending circumferentially about said drum, and tooth mountings on said drum parts and associated with said grooves whereby portions of said mountings engage the groove side walls for lateral support.

2. In a disintegrating head mechanism, a rotary mineral disintegrating drum having a cylindrical body provided with a series of annular peripheral grooves extending circumferentially thereabout along its length, and bit mounting-means carried by said drum and comprising bit supports over-lying said grooves and secured to said drum, said bit supports having portions received in said grooves.

3. A disintegrating head mechanism as set forth in claim 2 wherein said bit supports have sockets for receiving the shanks of the bits, said bit shanks having grooves extending longitudinally along their rear edges of V-shaped cross section and said bit support portions having their forward surfaces of V-shape in cross section and against which said rear bit surfaces abut, said V-shaped forward surfaces of said support portions being received in said V-shaped shank grooves.

4. A disintegrating head mechanism as set forth in claim 2 wherein said bit mounting means comprises supports rigidly secured to said drum periphery and provided with radial bit receiving sockets communicating with said grooves, bits having shanks received in said sockets with the inner ends of said shanks projecting into said drum grooves, and set screws carried by said supports and engaging said bit shanks for securing said bits in position on said drum.

5. A disintegrating head mechanism comprising a head frame pivotally mounted to swing in vertical planes and comprising a rear head frame part providing a rear pivoted end and an adjustable head frame part guided on said rear frame part for adjustment in a direction extending radially of the head frame pivot, said head frame parts having parallel vertical side frame portions which cooperate to provide guideways about their margins, endless disintegrating chains guided for orbital circulation along said guideways, and devices arranged longitudinally at the opposite sides of said head frame and connected between the front ends of said side frame portions of said rearward frame part and the forward portions of said adjustable frame part for adjusting the latter longitudinally relative to said rear part to vary the tension of said side chains, said adjusting devices disposed forwardly of the rearward portions of said adjustable frame part and having forwardly projecting portions abutting rearwardly facing surfaces at the sides of said adjustable frame part.

6. A disintegrating head mechanism as set forth in claim 5 wherein said parallel vertical side frame portions of said rear head frame part also provide longitudinal guides and said parallel vertical side frame portions of said adjustable head frame part provide guideways which slidingly receive said guides, said portions which provide said last mentioned guideways extending rearwardly into adjacency to the pivoted rear end of said rear frame part and the forward ends of said guide providing portions of said rear head frame part extending forwardly into adjacency to the forward ends of said side portions of said adjustable head frame part, and said adjusting devices being connected between the forward ends of said guide providing portions and said forward ends of said side portions of said adjustable head frame part.

7. A disintegrating head mechanism as set forth in claim 5 wherein said adjusting devices are hydraulically operated and comprise fluid cylinders containing reciprocable pistons, said cylinders carried by said rear frame part and said pistons having piston rods which provide said forwardly projecting portions which abut said rearwardly facing surfaces on said adjustable frame part, and means is provided for introducing the liquid under pressure into said cylinders.

8. A disintegrating head mechanism as set forth in claim 5 wherein an endless conveyor is mounted for orbital circulation on said relatively adjustable head frame parts longitudinally between said vertical side portions thereof for receiving mineral disintegrated by said head mechanism and for conveying such mineral rearwardly of said head mechanism.

9. A disintegrating head mechanism as set forth in claim 5 wherein a rotary toothed drum is journaled on the outer end of said adjustable frame part and has drive sprockets driven by said disintegrating chains whereby the latter effect drive of said drum in all adjusted positions of said adjustable head frame part.

10. A disintegrating head mechanism comprising a head frame pivotally mounted to swing in vertical planes and comprising a rear head frame portion providing a rearward pivot and an adjustable head frame portion guided on said rear frame portion for adjustment in a direction extending radially of the head frame pivot, said head frame portions having parallel vertical side frame portions which cooperate to provide guideways about their margins, endless disintegrating chains guided for orbital circulation along said guideways, a rotary toothed drum journaled on the outer end of said adjustable frame portion and driven by said side chains, an endless conveyor mounted for orbital circulation on said head frame portions for receiving mineral disintegrated by said drum and for conveying such mineral rearwardly of the head mechanism, said conveyor extending longitudinally between said side frame portions, and devices arranged at the opposite sides of said head frame and connected between said rearward frame portion and said adjustable frame portion for adjusting the latter together with said drum and the forward portion of said conveyor longitudinally relative to said rear frame portion to vary the tension of said side chains.

11. A disintegrating head mechanism comprising a head frame pivotally mounted to swing in vertical planes and comprising a rear frame portion of generally U-shape in plan and providing a rearward pivoted end, said rear frame having parallel elongated forwardly extending side frame portions provided by the legs of the U, an adjustable head frame portion having parallel rearwardly extending side frame portions, said rearward side frame portions slidably guided on said forwardly extending side frame portions along substantially the entire lengths thereof with their rearward ends disposed in adjacency to said pivoted end, said forwardly and rearwardly extending side frame portions cooperating to provide guideways at the sides of said head frame, endless side disintegrating chains guided for orbital circulation about said guideways, and a toothed disintegrating drum arranged transversely between the forward ends of said forwardly extending side frame portions and driven by said side chains.

12. A disinetgrating head mechanism as set forth in claim 11 wherein adjusting devices are arranged at the outer sides of said head frame between said forwardly extending side portions of said rear frame and said adjustable head frame portion for sliding said adjustable portion longitudinally relative to said rear frame to vary the tension of said side chains.

13. A disintegrating head mechanism as set forth in claim 11 wherein an endless conveyor is arranged longitudinally between the side portions of said head frame intermediate said side chains, and guiding means on said rear frame and said adjustable frame portion for guiding said conveyor for orbital circulation, said conveyor having its forward portion inclined forwardly and downwardly with respect to its rearward portion, with the forward receiving portion of said conveyor located near the bottom of said adjustable frame portion just rearwardly of said transverse disintegrating drum in a position to receive disintegrated mineral discharged from said drum.

14. In a disintegrating head mechanism, a rotary mineral disintegrating drum having a cylindrical body provided with a series of annular peripheral grooves extending circumferentially thereabout along its length, bit mounting means carried by and rigidly secured to said drum-body and having bit sockets communicating with said grooves, and bits received and secured in said sockets with their inner ends projecting into said grooves, the groove side walls providing lateral supports for said bits.

15. In a disintegrating head mechanism, a rotary mineral disintegrating drum, bit mounting means carried by said drum and arranged in staggered relation thereon and comprising bit supports having sockets for receiving the shanks of cutter bits, said bit shanks having grooves extending longitudinally along their rear edges of V-shaped cross section and said bit supports having portions provided with forward surfaces of V-shape in cross section and against which said bit surfaces abut, said V-shape forward surfaces of said support portions being received in said V-shaped shank grooves.

16. A disintegrating head mechanism as set forth in claim 15 wherein said disintegrating drum has a cylindrical body provided with circumferentially extending recesses and said bit supports and said bit shanks having portions received in said recesses whereby the inner walls of said recesses provide lateral supports for said bit supports and said bit shanks.

(References on following page)

References Cited in the file of this patent

UNITED STATES PATENTS

| Number | Name | Date |
|---|---|---|
| 527,965 | Gilbert | Oct. 23, 1894 |
| 1,148,974 | Kuhn et al. | Aug. 3, 1915 |
| 1,276,249 | Morgan | Aug. 20, 1918 |
| 1,538,947 | Newman | May 26, 1925 |
| 1,549,699 | Wilson | Aug. 11, 1925 |
| 1,549,701 | Wilson | Aug. 11, 1925 |
| 1,762,154 | Blair | June 10, 1930 |
| 1,811,927 | Halleck | June 30, 1931 |
| 1,903,673 | Hauge | Apr. 11, 1933 |
| 1,911,895 | Hemscheidt | May 30, 1933 |
| 2,287,230 | Cartlidge | June 23, 1942 |
| 2,422,645 | Moore | June 17, 1947 |
| 2,564,038 | Stephenson | Aug. 14, 1951 |